(12) United States Patent
Grossman et al.

(10) Patent No.: US 11,816,161 B2
(45) Date of Patent: Nov. 14, 2023

(54) ASSET SEARCH AND DISCOVERY SYSTEM USING GRAPH DATA STRUCTURES

(71) Applicant: Bit Discovery Inc., Santa Clara, CA (US)

(72) Inventors: Jeremiah Jacob Grossman, Haiku, HI (US); Robert Stephen Hansen, Austin, TX (US)

(73) Assignee: Bit Discovery Inc., Santa Clara, CA (US)

( * ) Notice: Subject to any disclaimer, the term of this patent is extended or adjusted under 35 U.S.C. 154(b) by 0 days.

(21) Appl. No.: 17/734,864

(22) Filed: May 2, 2022

(65) Prior Publication Data

US 2022/0277047 A1    Sep. 1, 2022

Related U.S. Application Data

(63) Continuation of application No. 16/890,995, filed on Jun. 2, 2020, now Pat. No. 11,347,797.

(60) Provisional application No. 63/025,900, filed on May 15, 2020, provisional application No. 62/937,432, filed on Nov. 19, 2019.

(51) Int. Cl.
| | | |
|---|---|---|
| *H04L 12/00* | (2006.01) | |
| *G06F 16/901* | (2019.01) | |
| *G06F 16/9538* | (2019.01) | |
| *G06F 16/25* | (2019.01) | |
| *H04L 61/3015* | (2022.01) | |
| *H04L 61/4511* | (2022.01) | |
| *H04L 61/5007* | (2022.01) | |
| *H04L 61/5076* | (2022.01) | |
| *H04L 67/02* | (2022.01) | |
| *H04L 101/37* | (2022.01) | |

(52) U.S. Cl.
CPC ........ *G06F 16/9024* (2019.01); *G06F 16/258* (2019.01); *G06F 16/9538* (2019.01); *H04L 61/3025* (2013.01); *H04L 61/4511* (2022.05); *H04L 61/5007* (2022.05); *H04L 61/5076* (2022.05); *H04L 67/02* (2013.01); *H04L 2101/37* (2022.05)

(58) Field of Classification Search
CPC .............. G06F 16/9024; G06F 16/258; G06F 16/9538; H04L 61/1511; H04L 61/2007; H04L 61/307; H04L 61/3025; H04L 67/02
USPC ......... 707/722; 709/223; 345/522, 440, 589, 345/420
See application file for complete search history.

(56) References Cited

U.S. PATENT DOCUMENTS

| | | |
|---|---|---|
| 6,509,898 B2 | 1/2003 | Chi et al. |
| 6,615,166 B1 | 9/2003 | Guheen et al. |
| 7,061,486 B2 | 6/2006 | Sowizral et al. |

(Continued)

OTHER PUBLICATIONS

International Search Report of PCT Application No. PCT/US2020/059918, dated Mar. 25, 2021.

(Continued)

*Primary Examiner* — Frantz Coby
(74) *Attorney, Agent, or Firm* — Haynes and Boone, LLP

(57) ABSTRACT

In a search and database system, a graph generator builds a graph, comprising nodes and edges, and stores that graph in a database or other data structure and uses a repeated extending and culling process to build the graph. From that storage, the graph can be used to generate displays for users interested in learning about the graph and/or for performing queries and the like on that graph data.

19 Claims, 7 Drawing Sheets

(56) References Cited

U.S. PATENT DOCUMENTS

| | | | |
|---|---|---|---|
| 8,978,010 | B1 | 3/2015 | Thumfart et al. |
| 10,425,340 | B2* | 9/2019 | Avidar .................. G01C 15/004 |
| 11,347,797 | B2* | 5/2022 | Grossman ............. G06F 16/258 |
| 2002/0089508 | A1* | 7/2002 | Sowizral ............... G06T 15/005 |
| | | | 345/522 |
| 2010/0002922 | A1 | 1/2010 | Wiemker et al. |
| 2010/0082703 | A1* | 4/2010 | Zhou ................... G06F 16/9027 |
| | | | 707/E17.014 |
| 2013/0076773 | A1 | 3/2013 | Chen et al. |
| 2014/0075004 | A1 | 3/2014 | Van Dusen et al. |
| 2014/0172745 | A1 | 6/2014 | Posch et al. |
| 2016/0112284 | A1 | 4/2016 | Pon et al. |
| 2016/0164905 | A1 | 6/2016 | Pinney Wood et al. |
| 2017/0039094 | A1* | 2/2017 | Dice ....................... G06F 9/526 |
| 2017/0310595 | A1 | 10/2017 | Avidar et al. |
| 2018/0239810 | A1 | 8/2018 | Pruitt et al. |
| 2018/0324050 | A1 | 11/2018 | Smith et al. |
| 2019/0205773 | A1* | 7/2019 | Ackerman ............... G06F 21/64 |
| 2020/0364088 | A1* | 11/2020 | Ashwathnarayan .. G06F 9/5016 |
| 2020/0372373 | A1 | 11/2020 | Tokarev Sela et al. |
| 2021/0081454 | A1 | 3/2021 | Sar Shalom et al. |

OTHER PUBLICATIONS

Onnela et al., "Asset trees and asset graphs in financial markets," Physica Scripta 2003, 2T106:48, retrieved from https:arxiv.org/pdf/cond-mat/0303579.pdf (2003).

European Supplementary Search Report dated Dec. 1, 2022 issued in EP Application No. EP20891001.8, p. 1.

* cited by examiner

ASSET SEARCH AND DISCOVERY SYSTEM USING GRAPH DATA STRUCTURES

CROSS-REFERENCE TO RELATED APPLICATION

This application is a continuation of U.S. application Ser. No. 16/890,995, filed Jun. 2, 2020, which claims priority to U.S. Provisional Patent Application No. 63/025,900, filed May 15, 2020, and U.S. Provisional Patent Application No. 62/937,432, filed Nov. 19, 2019, the disclosures of which are hereby expressly incorporated herein by reference in their entirety.

FIELD

The present disclosure generally relates to managing assets in a distributed computing environment. The disclosure relates more particularly to apparatus and techniques for performing searches of network-connected assets to identify assets under control of an entity.

BACKGROUND

Securing, controlling, and accessing an organization's computer and digital assets having network connectivity often requires an ability to track and inventory those assets. The assets might include computer systems, databases, and logical assets such as domain names, hosts, addresses, and the like. Often an organization might acquire another organization and not have a full picture of the assets they own and/or control.

Lacking information about assets owned or controlled can present security risks. For example, a server might respond to requests directed at a particular web address. If that server is not secured, it might provide an opening for hackers to infiltrate the rest of the owner's network infrastructure. If the owner is not aware that they own the asset, they might never spend the effort to ensure that it is secured, or remove it from network resources.

Consequently, it is desirable to be able to identify assets under control in a network-connected environment.

SUMMARY

In one embodiment of a search and database system, a graph generator that builds a graph, comprising nodes and edges, and stores that graph in a database or other data structure and uses a repeated extending and culling process to build the graph. From that storage, the graph can be used to generate displays for users interested in learning about the graph and/or for performing queries and the like on that graph data.

In some embodiments, the graph represents an inventory of Internet-connected assets and building the graph is done by a process of discovery from an initial set of nodes to a larger graph. The discovery process might involve a computer system, such as software running on a computer or server that has access to data about the assets, evaluating data and adding edges and nodes to the graph, as well as data about those edges and nodes. Some uses of this graph are to identify, inventory, display, manage, etc., the assets that are on the graph.

It may be that the assets are owned by one person or entity, or it may be that the assets are controlled by one person, entity or organization. For the purposes of the methods and systems described herein, it may be that it does not matter who or what actually has legal title to an asset and it is sufficient to determine that the graph is of assets that are controlled by a person, entity or organization, in that they own the assets, they possess the assets, they are tasked with managing the assets, they are interested in, or tasked with, securing the assets to preserve their value, they need to maintain the assets, or the like. As such, it may be that "owner" and "controller" of an asset might be used in different contexts and can be interchanged unless otherwise indicated.

In a specific embodiment, an initial node represents and asset with a known owner, where an owner refers to a person, entity or organization that has the legal right to control that asset and/or the technical ability to control that asset for themselves or on behalf of another. In that specific embodiment, a graph discovery computer or computer process expands the graph from the initial node to identify a larger graph of assets owned by that known owner. The resulting larger graph can represent an inventory of that owner's assets. This graph can be represented as a graph, or might be presented as a listing of assets.

Once the inventory is created, the owner might maintain those assets. Without a full inventory, some assets might be overlooked. For example, an owner might own a hostname or domain name and not know it, so it might be that the hostname no longer resolves to an IP address. In cases where the owner is a large organization, possibly after having acquired other entities, there might not be a central record of what assets that owner owns.

In a specific embodiment, a computer-implemented method is provided for constructing a graph data structure representing a prospective asset inventory graph and comprising nodes, each representing an asset of a network, and edges, each representing a connection between nodes and at least some edges having weights represented in the graph data structure and indicative of common control of assets represented in the graph data structure. The method comprises storing a representation of at least one seed asset in the graph data structure, extending the prospective asset inventory graph to include an additional node based on a matching criteria indicative of the additional node being presumed to be under the common control based on the matching criteria indicating a match between the additional node and a node already on the prospective asset inventory graph, recursively applying the matching criteria between the additional node and a third node representing a third asset not already represented on the prospective asset inventory graph, culling branches of the prospective asset inventory graph based on identification of edges having weights less than an indicia threshold indicative of common control, and updating the graph data structure based on the extending and culling.

The recursion could be automatic recursion or user-defined recursion. For user-defined recursion, a user or the system can choose to use only a subset of available methods of linking, based on selective depth, confidence, settings, or other criteria. The selection could be a selection that includes methods and/or excludes methods.

Extending might comprise reading the prospective asset inventory graph to identify metadata for known assets comprising a set of assets already on the prospective asset inventory graph, selecting predetermined metadata about the known assets, canonicalizing the metadata, searching an asset database for matches to the canonicalized metadata, filtering out nodes for assets where metadata is likely an artifact of a registration process rather than an indicia of ownership or control, and for each remaining match, adding that asset to the prospective asset inventory graph.

A weight of an edge of the prospective asset inventory graph might be a sum of individual matching weights, whereby a weight is increased for a larger number of matches. The nodes might be assigned confidence levels, wherein a confidence level of a node corresponds to a likelihood that the asset of the node is a commonly controlled asset. Additional nodes might be derived from a Domain Naming System (DNS) database, a historical DNS databases, and/or a WHOIS database, and extending the graph comprises searching the Domain Naming System (DNS) database, the historical DNS databases, and/or the WHOIS database to identify nodes satisfying a matching criteria. The culling might comprise obtaining manual inputs reflective of human input. Additional nodes might be derived from an IP address, a DNS type (e.g., A, AAAA, MX, NS, SOA, etc.), DNS registration data (e.g., e-mail address, postal address, telephone number, company name, etc.), and/or ASN information of the IP address.

The method might include formatting a representation of the prospective asset inventory graph into a display format, and presenting the display format on a display.

The metadata about the assets on the prospective asset inventory graph might comprise one or more of a hostname, a list of vulnerabilities, a list of open ports used, estimated geolocation of the asset, operating system used for the asset, service banners of the asset, and/or TLS certificate details of the asset. The assets of the network might comprise one or more of a domain, an Internet-connected asset, a subdomain, an IP address, a virtual host, a web server, a name server, IoT device, a desktop computer, a network printer, a mail server, or a device connected to the Internet or an internal network. Other assets might include content delivery networks, proxies, web application firewalls, intrusion detection systems, firewalls, routers, switches or any device that can accept network traffic.

In a particular embodiment, a first asset is a first domain, a second asset is a second domain, the first asset is on the prospective asset inventory graph, and the matching criteria comprises one or more of a first test for whether the second domain shares a common registration e-mail address with the first domain, a second test for whether the second domain shares a common registration e-mail address domain with the first domain, a third test for whether the second domain was registered using e-mail address with an e-mail domain matching that of the first domain, a fourth test for whether the second domain and the first domain share a common IP address, a fifth test for whether the second domain and the first domain share a WHOIS field in common, a sixth test for whether the second domain and the first domain share a CIDR block in common, a seventh test for whether the second domain and the first domain share a CIDR feature in common, an eighth test for whether the second domain and the first domain both include hosted content that refers back to a common host, and a ninth test for whether the second domain and the first domain both use a common certificate authority. Some test might be performed using historical data. For instance, some tests might involve a comparison of data elements as they existed at a common point in time, as in testing whether two domains shared a common IP address at a specific point in time, regardless of the case where they no longer share a common IP address.

The following detailed description together with the accompanying drawings will provide a better understanding of the nature and advantages of the present embodiments.

DETAILED DESCRIPTION

Figure 1:
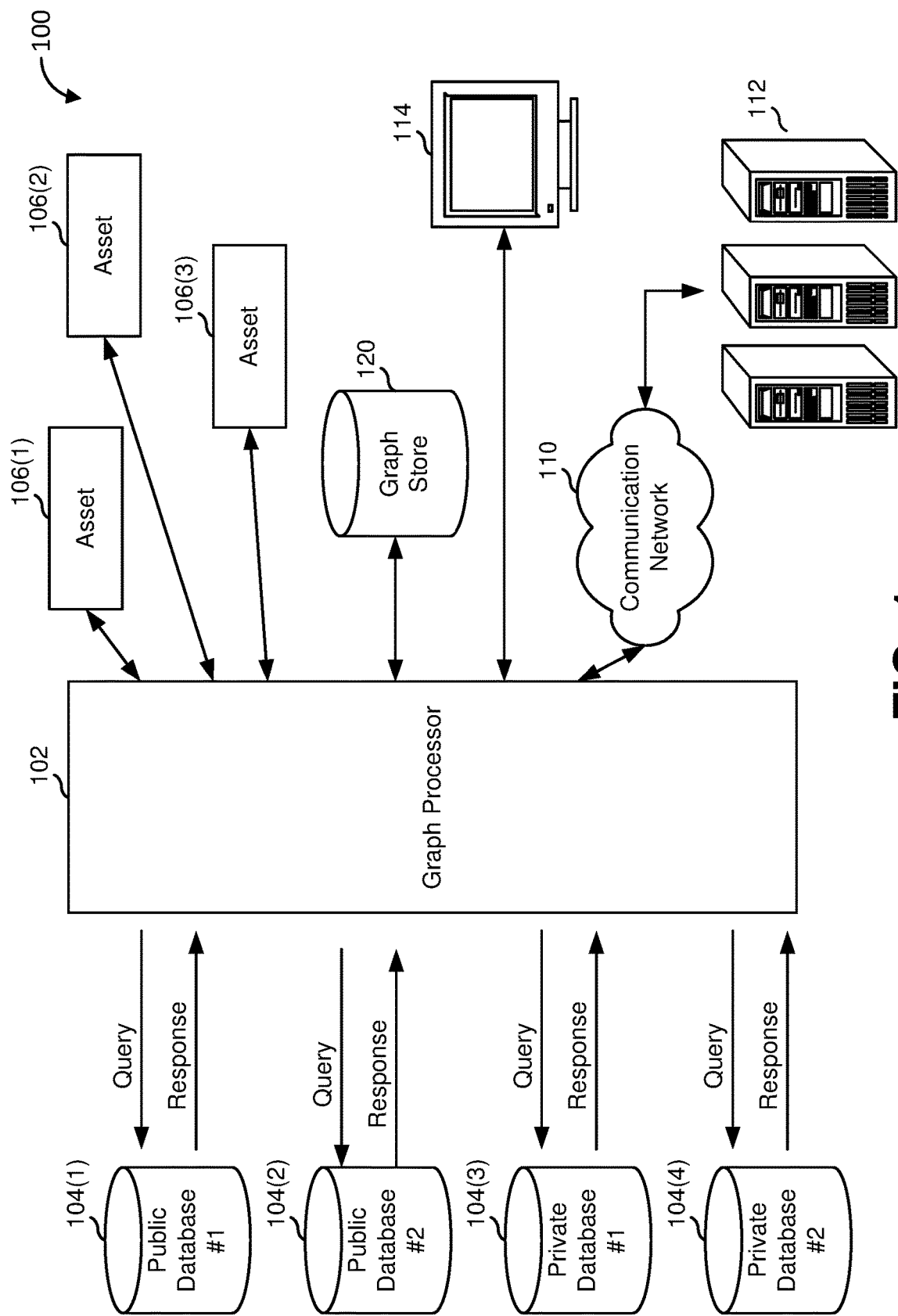
FIG. 1 illustrates a graph processing system for processing asset graphs, according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include building graphs of assets, sometimes using an expansion and culling process.

Overview

A search and database system is described. In one embodiment, the system is a graph generator that builds a graph, comprising nodes and edges, and stores that graph in a database or other data structure and uses a repeated extending and culling process to build the graph. From that storage, the graph can be used to generate displays for users interested in learning about the graph and/or for performing queries and the like on that graph data.

In some embodiments, the graph represents an inventory of Internet-connected assets and building the graph is done by a process of discovery from an initial set of nodes to a larger graph. The discovery process might involve a computer system, such as software running on a computer or server that has access to data about the assets, evaluating data and adding edges and nodes to the graph, as well as data about those edges and nodes. Some uses of this graph are to identify, inventory, display, manage, etc., the assets that are on the graph.

It may be that the assets are owned by one person or entity, or it may be that the assets are controlled by one person, entity or organization. For the purposes of the methods and systems described herein, it may be that it does not matter who or what actually has legal title to an asset and it is sufficient to determine that the graph is of assets that are controlled by a person, entity or organization, in that they own the assets, they possess the assets, they are tasked with managing the assets, they are interested in, or tasked with, securing the assets to preserve their value, they need to maintain the assets, or the like. As such, it may be that "owner" and "controller" of an asset might be used in different contexts and can be interchanged unless otherwise indicated.

In a specific embodiment, an initial node represents and asset with a known owner, where an owner refers to a person, entity or organization that has the legal right to control that asset and/or the technical ability to control that asset for themselves or on behalf of another. In that specific embodiment, a graph discovery computer or computer process expands the graph from the initial node to identify a larger graph of assets owned by that known owner. The resulting larger graph can represent an inventory of that owner's assets. This graph can be represented as a graph, or might be presented as a listing of assets.

Once the inventory is created, the owner might maintain those assets. Without a full inventory, some assets might be overlooked. For example, an owner might own a hostname or domain name and not know it, so it might be that the hostname no longer resolves to an IP-address. In cases where the owner is a large organization, possibly after having acquired other entities, there might not be a central record of what assets that owner owns. In some instances control and ownership are coextensive, but in other cases, they might not be. In the general case, processes that involve determining ownership can be used for ownership, control, or both.

A common asset is a domain, as often there are many Internet-connected assets that can be identified by a URL that refers to a domain and typically assets identified by a domain are under common ownership or control, with such ownership or control possibly not being readily apparent. However, assets need not be so limited. Internet-connected or Internet-related assets might include designators such as domains (identifiable by domain names), subdomains (e.g., a domain name with a hostname appended, sometimes more accurately described as a fully qualified domain name, or FQDN), IP addresses, virtual hosts, and/or any combination thereof, and devices connected to the Internet or an internal network that use those designators might also be assets of the owner of those designator assets. Internet-connected assets might be on public networks, non-routable or internal networks, etc.

Assets may include web servers, name servers, IoT devices, desktop computers, network printers, mail servers, other servers, hosts, etc. An asset inventory might be represented by a data structure, such as a relational database, that indicates the assets and metadata of each asset. An asset management system might provide an asset owner which control over the assets in the asset inventory. Management of assets might include transferring those assets to others, controlling those assets, configuring those assets, maintaining those assets, setting up network security to protect those assets, etc.

Metadata about the assets in an asset inventory might include hostnames, details of vulnerabilities, open ports used, etc., and can be important when securing assets. Other metadata might include geolocation, operating system, service banners, TLS certificate details, etc. The graph data structure might have metadata on a node-by-node basis, on an edge-by-edge basis, some combination of those, or some other basis.

Building a Prospective Asset Inventory Graph

In a particular embodiment of a discovery process that builds an asset inventory, the discovery process extends a graph from one or more initial nodes, possibly with some predetermined edges, to a larger graph that might be treated as a prospective asset inventory. A prospective asset inventory might have nodes that are not in fact commonly owned with other nodes, but can serve as an initial guide for further human or computer review to assess whether those assets are actually owned by the owner of the assets.

FIG. 1 illustrates a graph processing system 100 for processing asset graphs, according to an embodiment. As illustrated there, a graph processor 102 makes queries to various public or private databases 104 to obtain data and records and interacts with various assets 106 to obtain data from those assets. The data and records obtained might be as described herein. Graph processor 102 might be coupled to other systems 112 via a communication network 110, such as the Internet. A user interface 114 might be provided and might be used for culling, adjusting, and/or providing feedback for graph construction, as described herein. A graph storage 120 might be provided for storing a constructed graph and made available to other processes not shown. Graph processor 102 can build up a graph from data from databases and assets themselves, using some processing methods, to generate a graph.

Figure 2:
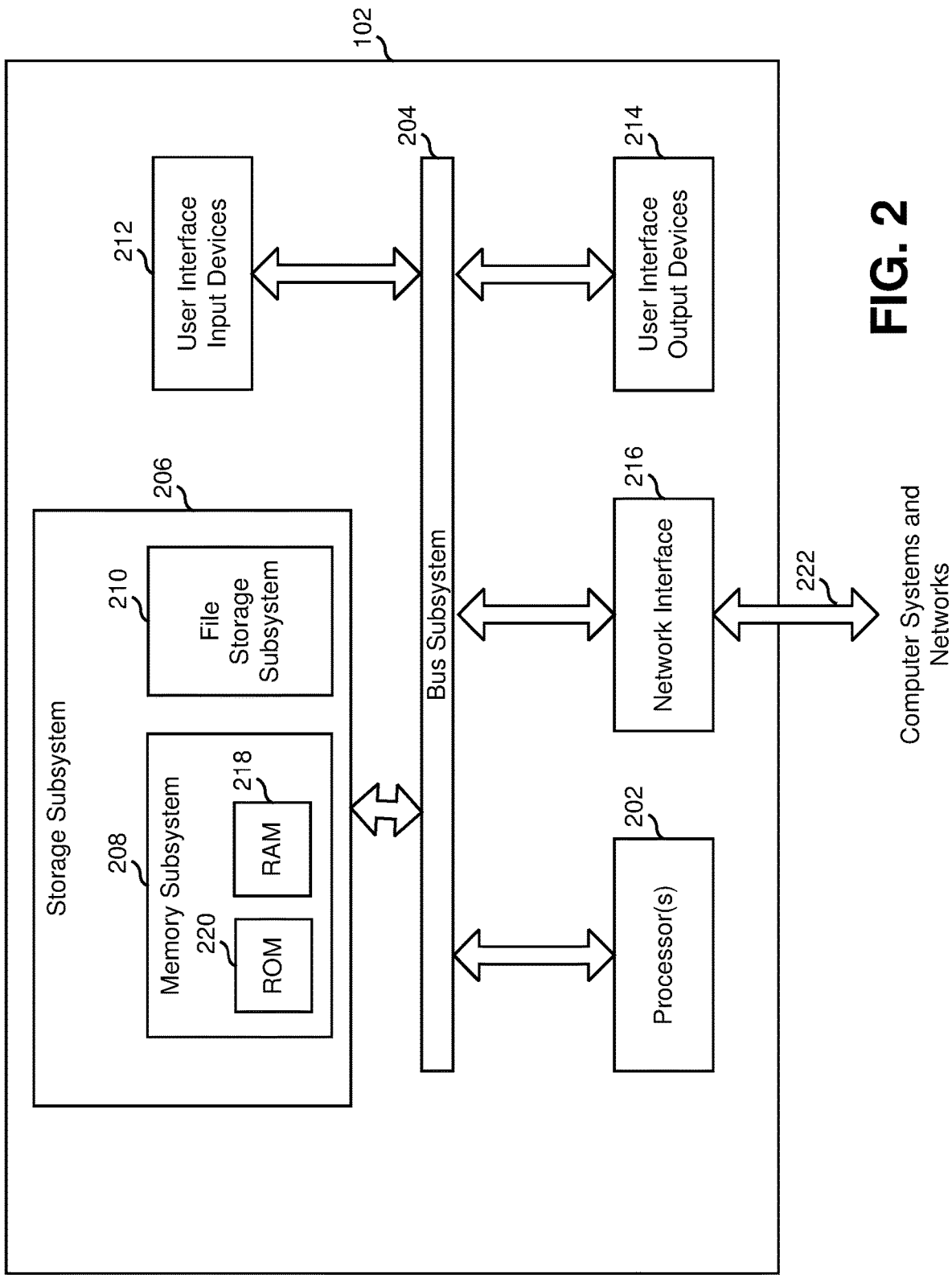
FIG. 2 illustrates a graph processor, according to an embodiment.

FIG. 2 illustrates more details of graph processor 102, which might comprise one or more computer systems and one or more processors 202 that may be configured to communicate with and are operatively coupled to a number of peripheral subsystems via a bus subsystem 204. These peripheral subsystems may include a storage subsystem 206, comprising a memory subsystem 208 and a file storage subsystem 210, one or more user interface input devices 212, user interface output devices 214, and a network interface subsystem 216.

Bus subsystem 204 may provide a mechanism for enabling the various components and subsystems of computer system 200 to communicate with each other as intended. Although the bus subsystem 204 is shown schematically as a single bus, alternative embodiments of the bus subsystem may utilize multiple busses.

Network interface subsystem 216 may provide an interface 222 to other computer systems and networks. Network interface subsystem 216 may serve as an interface for receiving data from and transmitting data to other systems such as to obtain graph data or user feedback.

The user interface input devices 212 may include a keyboard, pointing devices, and other types of input devices. The user interface output devices 214 may include a display subsystem, a printer, non-visual displays (e.g., audio and/or tactile output devices), or other such display devices. In general, use of the term "output device" is intended to include all possible types of devices and mechanisms for outputting information. The user interface output devices 214 may be used, for example, to generate and/or present user interfaces to facilitate user interaction with applications performing processes described herein and variations therein, when such interaction may be appropriate.

The storage subsystem 206 may provide a computer-readable storage medium for storing the programming and data constructs that provide the functionality of the graph processor. Software (programs, code modules, instructions) that, when executed by one or more processors 202 may provide the functionality of the embodiments described herein, may be stored in storage subsystem 206. Storage subsystem 206 may also provide a repository for storing data used in graph processing. Example software might include program code to implement the culling, filtering, adjusting, searching, and other functions described herein.

Memory subsystem 208 may include a number of memory devices including, for example, random access memory (RAM) 218 for storage of instructions and data during program execution and read-only memory (ROM) 220 in which fixed instructions may be stored. The file storage subsystem 210 may provide a non-transitory persistent (non-volatile) storage for program and data files, and may include a hard disk drive, and other storage media.

Graph processor 102 might comprise various types of computers and be implemented in a wide variety of operating environments, which in some cases can include one or more user computers, computing devices or processing devices that can be used to operate any of a number of applications. User or client devices may include any of a number of general purpose personal computers, such as desktop, laptop or tablet computers running a standard operating system, as well as cellular, wireless and handheld devices running mobile software and capable of supporting a number of networking and messaging protocols, perhaps depending on user selection of interface. Various embodiments may use at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), etc. Storage media and computer-readable media for containing code, or portions of code, can include appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data.

Figure 3:
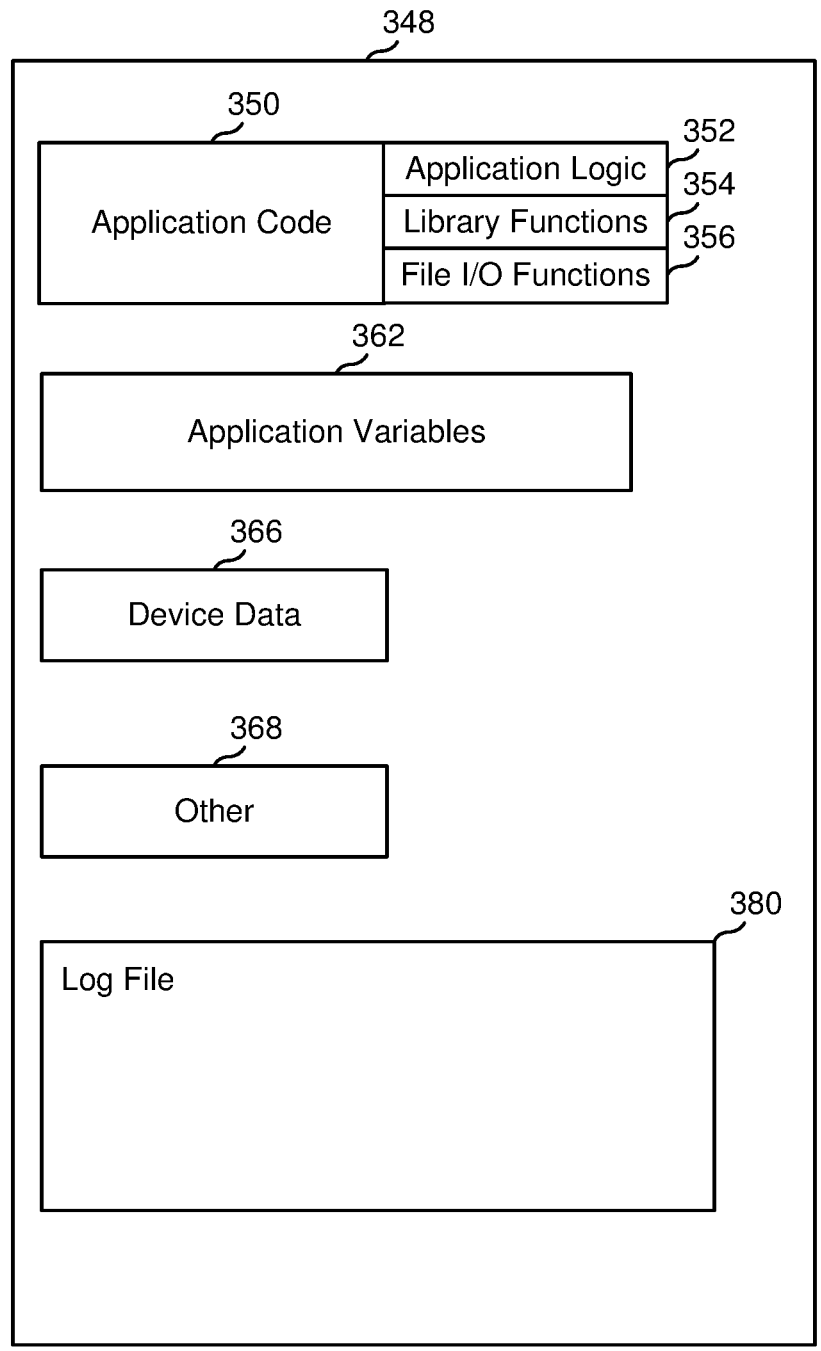
FIG. 3 illustrates elements used as part of a graph processor, according to an embodiment.

FIG. 3 illustrates elements used as part of a graph processor, according to an embodiment. FIG. 3 also illustrates an example of memory elements that might be used by a processor to implement elements of the embodiments described herein. For example, where a functional block is referenced, it might be implemented as program code stored in memory. FIG. 3 is a simplified functional block diagram of a storage device 348 having an application that can be accessed and executed by a processor in a computer system as might be part of a graph processor and/or a computer system that uses asset graphs in managing assets under control. The application can be one or more of the applications described herein, running on servers, clients or other platforms or devices and might represent memory of one of the clients and/or servers illustrated elsewhere. Storage device 348 can be one or more memory device that can be accessed by a processor and storage device 348 can have stored thereon application code 350 that can be configured to store one or more processor readable instructions. The application code 350 can include application logic 352, library functions 354, and file I/O functions 356 associated with the application.

Storage device 348 can also include application variables 362 that can include one or more storage locations configured to receive application variables. The application variables 362 can include variables that are generated by the application or otherwise local to the application. The application variables 362 can be generated, for example, from data retrieved from an external source, such as a user or an external device or application. The processor can execute the application code 350 to generate the application variables 362 provided to storage device 348.

One or more memory locations can be configured to store device data 366. Device data 366 can include data that is sourced by an external source, such as a user or an external device. Device data 366 can include, for example, records being passed between servers prior to being transmitted or after being received. Other data 368 might also be supplied.

Storage device 348 can also include a log file 380 configured to store results of the application or inputs provided to the application. For example, the log file 380 can be configured to store a history of actions.

The memory elements of FIG. 3 might be used for a server or computer that interfaces with a user, generates graphs, and/or manages other aspects of a process described herein.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Building a Graph

In some embodiments, graphs are built and in others, they are obtained from external sources. A process for building a prospective asset inventory graph will now be described. The process can operate on a computer system that has inputs, memory, outputs, and access to a network such as the Internet and can access databases of interest, such as the Domain Naming System (DNS) database, historical DNS databases, the WHOIS databases, and the like.

In such a process for building a prospective asset inventory graph, a number of steps, described below, might be used to add a node and/or an edge to the prospective asset inventory graph based on nodes and edges in the graph and/or metadata about those edges and nodes.

In some processes, a graph starts with a node, other nodes are added as other assets are discovered with some relationship to existing nodes (and perhaps some weight indicated for a graph edge between an existing node and a new node), but also the process involves culling nodes that later appear to be less associated with the graph. The culling might also involve manual inputs. For example, a graph might be built to include example.com, example1.com, example-inc.com, and example-inc-sucks.com and a manual review would cull example-inc-sucks.com from the graph upon a manual reviewer determining that that domain is not actually commonly owned or controlled, or not likely so, with the other assets.

Using some feedback, including user feedback after observing a display of a graph, the process might add other nodes or cull branches of the graph.

Domain Addition

In some cases, domains are added to the prospective asset inventory graph if they have some metadata in common with domains already in the prospective asset inventory graph, such as the same e-mail address used to register a domain or the same phone number. In general, in a matching process, depending on the field, canonicalization of data might be done before a matching step (e.g., make all strings lower case, remove punctuation, dashes and spaces in phone numbers, replace common homoglyphs—so that zero is treated the same as the letter "O," etc.).

A matching process might include steps of (a) reading the prospective asset inventory graph to identify a metadata for a set of domains already in the prospective asset inventory graph (the known domains), (b) selecting particular metadata about the known domains, (c) canonicalizing that metadata, (d) search a domain database (such as the DNA database, the WHOIS database, etc.) for matches to that canonicalized metadata, (e) optionally filter out domains where the metadata is likely an artifact of the registration process rather than an indicia of ownership (e.g., use of a "whoisguard"-type email address for registration, an IP address that points to a large cloud service that provides services to the owner and many other unrelated parties, an e-mail domain name of an e-mail service provider rather than the owner's own domain name, etc.), (f) for each remaining match, add that domain to the prospective asset inventory graph, and (g) Iterate as desired (e.g., until no new domains are added, or until some predetermined number of iterations are performed).

In addition to, or instead of, canonicalization, wildcard expression, such as regular expressions, might be used. For example, in searching the WHOIS database, the search term might be "example.*\.com" and return all domains in the WHOIS database that have whois/zone="example.*\.com."

The databases used to search might be current databases or historical databases. For example, where a domain was registered using a company e-mail address as the registration address or the technical contact address, but later changed to a private registration wherein the registration address or the technical contact address are those of the registrar, reference to a historical DNS database or historical WHOIS database might provide more connections and better identify assets of the particular owner. As another example, where an owner switches to a cloud provider's subnet (e.g., Cloudflare, Incapsula, DoSArrest, Akamai, etc.), the matching process can scan a historical database to find a time when the owner's domain was not using such a subnet, look at the IP address at that time and find what other domains were pointing at the same IP at the time. Then fast forward to today, and see which are still in the same location. This may provide the matching process with many false positives, though, due to shared hosting and other reasons. Aside from databases per se, other data structures, such as one or more of a binary tree, a sharded set of files, a lookup table, and/or an mtbl data structure might be searched. More generally, a data structure that allows for efficient lookups could be used, either directly integrated, accessible via an API, iterating over a flat file, using in-memory pointers or caches, or some other method.

The databases that a graph processor accesses might be public databases, such as publicly available DNS servers, or might be private databases maintained and provided by subscription, such as historical WHOIS databases, or might be private databases maintained internally by the operator of the graph processor.

Culling

In some embodiments, a graph or database of assets is already known but might not have any indication of ownership or control. In other cases, this graph or database might be constructed or accessible for queries such that it does not need to be created, which could then be used for a process of determining a graph of assets that are under common ownership by filtering out assets that appear not to be under common ownership and/or culling branches of a graph that appear not to be under common ownership. Some data that is indicative of common ownership or its opposite might be noisy data. Using a plurality of indicators, a more robust graph of common ownership might be constructed. The graph of common ownership might be further improved by taking in human feedback as to where a graph might be split or multiple graphs combined. Additional indicators might be processed to adjust graph edge weights to improve fidelity of the graph. A graph might not exactly show all commonly owned assets and no assets not commonly owned, but nonetheless such a graph can still be useful as providing valuable information as to ownership of assets. One example is an entity seeking to secure their assets by placing network controls on them, updating them with patches, decommissioning unused assets, etc. With a good graph, the entity can then track and service assets the entity owns, even if occasionally the graph suggests an asset that is not in fact owned by the entity and might miss some assets in fact owned by the entity. Thus, a graph need not be perfect, but should provide some filtering so that the tasks of asset review are manageable.

In an embodiment, an asset evaluation system might process, or access, a graph or database of network-connected assets and run a series of evaluations to determine which of the assets are or are not likely associated with a particular owning entity. Thus, some of the evaluations are of positive indicators and some of the evaluations are of negative indicators.

Additional indicators might be from human input, possibly after review of the graph or not. In some embodiments, human input can be used not only to modify the data but the rules used by the graph processor to process data it finds. For example, a user might select an option for the graph processor to skip, or not consider, any URL similarities in assessing asset common ownership.

Weighting Edges

In some cases, a weight might be assigned to an edge. For example, if a first domain that is in the prospective asset inventory graph is known with certainty to be commonly owned with a second domain that is not in the prospective asset inventory graph, the second domain can be added as a node in the graph with an edge connecting the first domain and the second domain and the edge having a weight of 1.0. Where the particular search step done to add a new node might be more speculative, an edge might be assigned with a lower weight. For example, if a domain <companyname1.com> is already a node in the prospective asset inventory graph and via canonicalization, the domain <companynameI.com> is being considered for addition as a new node in the prospective asset inventory graph, an edge might be added in the prospective asset inventory graph between the node for <companyname1.com> and the node for <companynameI.com> and the metadata for that edge recorded that represents a weight of 0.6 to reflect a possible uncertainty as to whether the two domains are commonly owned. Thus, some search steps might return a domain or other node detail, in addition to a connection weight.

When presenting a representation of an asset graph, some indication of the weight might be presented and might be presented as a confidence rating. Where the confidence of one node being for an asset owned by a possible owner is based on a chain of nodes, the confidence rating can be adjusted accordingly. For example, if the prospective asset inventory graph indicates for certain that an owner O owns a domain "owner-o.tld" and with 40% probability of also owning the domain "owner-oh.tld" and the discovery process determines that the domain "owners-of-oh.tld" has a 50% probability of being commonly owned with the domain "owner-oh.tld," then the discovery process might involve adding a node to the prospective asset inventory graph for the domain "owner-oh.tld" and giving it a confidence value or weight indicating those probabilities. This might be 40%*50%=20% or some other manner of combining weights.

Weights might be additive. For example, where one search shows that two domains have a common registration e-mail address, the edge between those two domains might be assigned a weight of W1 and if another search shows that those two domains share a certificate authority and that sharing would by itself merit a weight of W2, the weight used in the prospective asset inventory graph between the nodes for those two domains might be a weight of W1+W2 or at least a weight greater than the higher of W1 and W2.

In addition to weighting of edges—which might represent the relative confidence that if one node represents an asset of an owner, another node is likely also an asset of the owner, nodes themselves could have metadata indicative of a confidence level. The latter would be a confidence level that a given node is owned by a given owner, independent of other nodes and edges that might be present. The confidence level for a node might be a function of confidence levels of edges connected to that node, but might be computed in some other manner.

Figure 4:
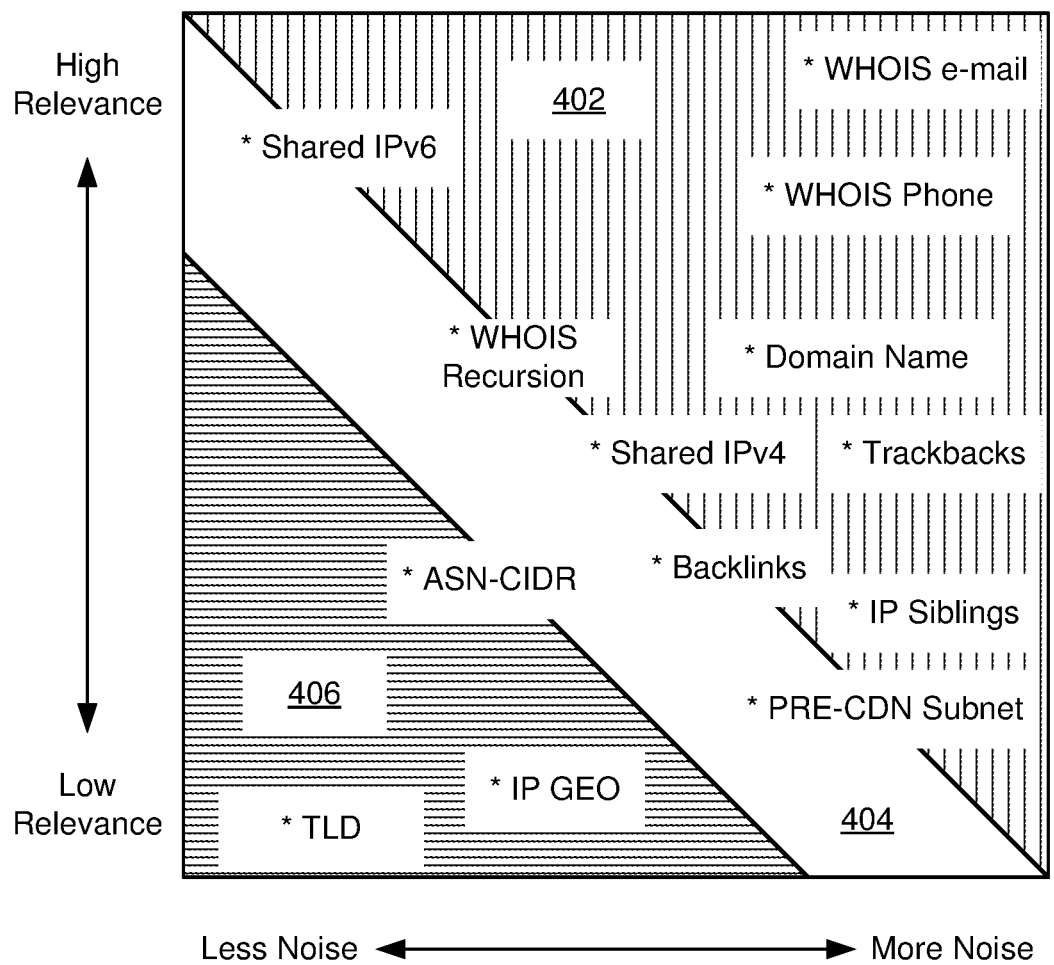
FIG. 4 illustrates an example of weighting that might be applied to data points possibly indicating common control of assets.

FIG. 4 illustrates an example of weighting that might be applied to data points possibly indicating common control of assets, as might be used to avoid introducing too much noise into the added data. As illustrated there, some more relevant indicia would be ranked high, and noisy indicia ranked lower. A graph processor might be programmed such that indicia falling in area 402 is deemed to have sufficient quality to allow an automated acceptance of the data, while indicia falling in area 404 is flagged for human intervention, and indicia falling in area 406 is not considered, or hidden from view.

Examples of Domain Match Rules

Some examples of domain matches that result in domains being added to the prospective asset inventory graph having common control might include:

1. Two (or more) Domains Share a Common Registration E-mail Address: For domains that are present in the graph, the WHOIS database can be queried to identify e-mail addresses of the contact persons supplied when the domain was registered, such as the technical contact, the administrative contact, etc. Those e-mail addresses can then be used as a query input to find records of domains having a registration e-mail address that matches a registration e-mail address of a domain already in the prospective asset inventory graph. A logical expression for this sub-process might be:

(domain1.registration_email_address===domain2.registration_email_address).

2. Two (or more) Domains Share a Common Registration E-mail Address Domain: Like #1, but where the username of the registration e-mail address does not need to match, just the e-mail domain, optionally filtering out populous shared domains that do not indicate likely common control of assets. (E.g., registrations using username1@gmail.com and username2@gmail.com would not necessarily indicate common control, as gmail.com is shared among many unrelated users.). A logical expression for this sub-process might be:

(hostname(domain1.registration_email_address)
===hostname(domain2.registration_email_address)

3. A Domain Registered using E-mail Address with Domain of Existing Domain in Graph: The domain names of each of the domains already on the graph can be queried from the graph. The WHOIS database can then be searched to find other domains that have contact info e-mail addresses where those addresses include domains that are on the graph. For example, if example.com is on the graph, this matching step would identify other domains in the WHOIS database that have contact info e-mail addresses of the form user@example.com. A filter might be put in place so as to not capture domains that have their contact info e-mail addresses having hosted by common e-mail services. However, this filter might not be needed where the graph is not likely to contain as assets those domains that refer to common e-mail services (e.g., a graph being built for other than the controller of gmail.com is a graph that is not likely to include gmail.com as one of the user's assets). A logical expression for this sub-process might be:

(domain1===domain2.registration_email_address.domain).

4. Two (or more) Domains Share a Common IP Address: For domains that are present in the graph, a DNS lookup could be done, for each existing domain, to identify an IP address at which that domain is hosted. Then the DNS data could be searched for other domains that also are hosted at that same IP address and those other domains added to the graph. A filter might be provided to preclude adding in domains where the IP address is associated with a cloud hosting service—otherwise, a large number of unrelated domains of customers of the cloud hosting service that are not under common end-user control would be added to the graph. A logical expression for this sub-process might be:

(domain1.ip_address===domain2.ip_address).

5. Two (or more) Domains Share Other WHOIS Fields in Common: For domains that are present in the graph, the WHOIS database can be queried to identify WHOIS fields other than contact e-mail addresses and those fields can then be used as a query input.to find records of other domains also having those fields in common, which can indicate common control. Examples include:

a. Phone #, as in:
     (domain1.phone_number===domain2.phone_number)
   b. CIDR block
   c. IP address of the person or entity that registered the domain (can be obtained from an abuse-monitoring database service).

6. Matching Content Cross-References: Some hosted content on a first host might refer to content on another host and/or hosted content on two hosts might both refer back to another host, and this can be an indicia that the first host and second hosts are assets controlled by the same entity. In that case, if the first host is on the graph and the second host is not, the second host can be added to the graph with an edge between the first host and the second host where the edge has a weight determined based on the cross-references. One example of such cross-referencing are trackbacks used on blogging sites that signal between blogs as to updates and other events on one blog so that software managing the other blog can update accordingly. The trackbacks might be represented by trackback URLs embedded in the content.

One specific example of trackback URLs is used with WordPress blogs, wherein WordPress content might include trackback URLs. A logical expression for this sub-process might be:

(domain1.html.wordpress_trackback===domain2.html.
wordpress_trackback).

Another example is for callbacks. Program code can be triggered that would make a request, such as an HTTP request, of a first host that is on the graph. The machine issuing the HTTP request might receive a callback in response. That callback might be from a second host that is not on the graph. The domain name, IP address, and/or URL of the callback return might be added to the graph depending on the likelihood that the recipient of the request and the issuer of the callback to that request are assets commonly controlled.

7. Two (or more) Assets Share a CIDR Block: A Classless Inter-Domain Routing (CIDR) block can represent a range of IP addresses that might be commonly controlled. Some assets can be mapped to particular CIDR blocks. For example, a search process can query a local DNS system to find a first IP address that is associated with a first asset that is a first subdomain and a second IP address that is associated with a second asset that is a second subdomain. If the first IP address and the second IP address are in the same CIDR block, the first asset is on the graph, and the second asset is not, then the second asset might be added to the graph on the basis of them both pointing to a commonly assigned CIDR block.

Typically, if one entity is assigned an entire CIDR block (which might be determined through an IP address registry or allocation database), then it might be that subdomains pointing to IP addresses in that CIDR block are commonly controlled by that entity. The determination to add assets to the graph might be filtered to preclude adding in assets where the IP address is associated with a cloud hosting service or a software-as-a-service service—otherwise, a large number of unrelated assets of customers of the services that are not under common end-user control would be added to the graph.

When an asset is added based on having a CIDR block in common with an asset already on the graph, an edge between the assets might be added to the graph with a weight corresponding to an indication of a strength of the asset's tie to the CIDR block.

The applicability of adding such nodes, or the weights used, might depend on data stored from feedback obtained, perhaps from human users. For example, where other users have indicated that assets in a common CIDR are not commonly controlled, then that might down-weight later matches.

The step of adding nodes based on common CIDR blocks might have a threshold wherein more than one controlled asset needs to be present in a common CIDR block, such as five or ten assets, before an asset is added to the graph.

8. Two (or more) Assets Share a Common IP Range Defined by Other Assets: Where a first asset and a second asset are listed in a graph and have distinct IP addresses, those IP addresses define a range of IP addresses. When considering other assets having associated IP addresses that are assets not on the graph, they might be added to the graph on that basis. This can derive from an assumption that if assets at multiple IP addresses are controlled by a single entity, that single entity likely might also control the IP addresses between those known IP addresses. The determination to add assets to the graph might be filtered to preclude adding in assets where the IP address is associated with a cloud hosting service or a software-as-a-service service—otherwise, a large number of unrelated assets of customers of the services that are not under common end-user control would be added to the graph.

When an asset is added based on having an IP address in a range between the IP addresses of assets already on the graph, an edge between the assets might be added to the graph with a weight corresponding to an indication of a strength of the asset's tie to the IP address range.

The applicability of adding such nodes, or the weights used, might depend on data stored from feedback obtained, perhaps from human users. For example, where other users have indicated that assets in an IP address range are not commonly controlled, then that might down-weight later matches.

9. Two (or more) Assets Share Other CIDR Block Features: Where one asset is on the graph and another asset has a feature in common and is not on the graph, the second asset can be added. An example of a feature in common is that the domains have common features like "example.*\.com" domain surrounding IP space for all domains for similar looking domains. Narrow down by the least/most limited CIDR block taken from RIR zone files.

10. Two (or more) Assets Have an ASN Correlation: Where ASN information of a first domain that is on the graph matches the ASN information of a second host that is not on the graph, the second host can be added to the graph with an edge between the first host and the second host. Domains with common ASN information are likely all pointing to the same space—especially where the overlap is large between two or more domains pointing into that same IP space. An ASN might be an autonomous system number that uniquely and globally identifies an autonomous system. An autonomous system might comprise hosts using connected IP routing prefixes and controlled by a particular administrative entity or domain, or controlled by an Internet service provider (ISP). The ASNs might be registered in a global registry.

11. Certificate Authority (CA) correlation: The process extracts from the node metadata, where available, which CAs domains use. The list of in-use CAs is then used as the search input to search a CA database or tree to identify other domains not in the graph already where those domains have a CA in common with domains that are in the graph. This would catch assets that share CA, which might indicate a likelihood of them being commonly owned. This can be weighted based on how large the CA is—two domains sharing a larger CA might be less likely to be commonly owned than two domains sharing a smaller CA.

12. Analyze Historic DNS and WHOIS Entries: In addition to walking through a present time DNS database or WHOIS database, some of the above steps might be performed on historical or archived versions of a DNS database or WHOIS database to identify additional nodes for the graph. Weights of edges of nodes added via a historical search might be weighted based on how old the record is. For example, if a first domain is on the graph and a second domain and third domain are not, but the second domain and third domain have a registration e-mail address in common with the first domain or they all were in the past associated with a common IP address, the second domain and third domain might be added to the graph. If the connection between the first domain and the second domain is much more recent in the historical data than the connection between the first domain and the third domain, then perhaps the edge between the first domain and the second domain would be assigned a higher weight than the edge between the first domain and the third domain.

Domain or Webpage Addition Based on Webpage Content

In another process, tentative ownership of an asset such as a domain name, a webpage, or the like, is done by processing content of webpages. By considering such content, an automated process can determine whether to add an asset to the prospective asset inventory graph. Canonicalization might be used here as well.

A matching process might include steps of reading the prospective asset inventory graph to identify strings or other metadata that can serve as indicia for ownership. For example, a webpage might include a copyright notice and a company name, or a company name embedded in its HTML code. Then, those indicia are searched for in other content, such as webpages, search engine indices, etc. Matches that are found in searching can be added to the prospective asset inventory graph. Filtering for known false positives can be done as well. Iteration might be done as assets are added, iterating over the newly-added assets as desired (e.g., until no new domains are added, or until some predetermined number of iterations are performed).

Examples of such indicia can include:

1. Advertising System Keywords (e.g., Google Analytics keys, or Google Adwords keys): Search over the content for a particular keyword, identify domains or other assets that include that keyword and add it to the graph.

2. Link Tags: Search for link tags containing a rel type to identify when two or more sites claim to be the same site/page. Canonicalization could be used, or not.

3. Unique strings on different HTML pages: Look for company name and copyright notices that match other HTML on other sites (EG: Copyright 20xx, Company Inc.). The names might be canonicalized so that slight misspellings and variations are treated as being the same.

Other Examples

1) One test that might be performed would be to check whether a site, S, has pages that include links to particular other sites, thus indicating possible correlations. Some excessively common linked-to sites might be excluded to avoid inferring correlations with unrelated but common sites such as large search engine sites and large social medial sites. These correlations might be computed and presented as histograms, stored as blacklists, or use user feedback to indicate likely false positives, such as machine learning output indicative of an object not being an asset. For example, data from a graph can be provided to a user familiar with networking and Internet protocols and service providers, who might then easily spot a connection that was flagged as being under common control but know that certain service providers use that connection over unrelated customer assets. Such connections might then be labeled as false positives.

2) Another test is to have the system perform nearness testing of URLs. For example, a URL containing "example.com" might be deemed to be correlated with another URL that contains "example-test.com." User feedback, or a computer process, might determine that some URLs that appear to be under common control might be, but the underlying asset is not. For example, where the URLs are generated by a content delivery network or cloud service provider to multiple unrelated customers of theirs, while the objects might have similar and related URLs, such as asset1.<CDN-TLD>.com and asset2.<CDN-TLD>.com, that similarity does not necessarily result from common control of those assets.

3) In yet another test, if a site Y is found while following links starting from a site X, and site Y includes links to pages of site X, that can be deemed to be a correlation of X and Y.

4) If site X and site Z are both in stored in a site inventory and are found to both link to pages of site Y, and links on pages of site Y point to X or Z, that can be used as an indication of correlation.

5) Filtering for internal-use addresses: In some embodiments, it might be useful to flag where a correlation is assumed based on, for example, IP addresses that appear to be related but where those IP addresses are internal-use, such as addresses 10.x.x.x and 192.168.x.x, that are known to be used by unrelated parties for their internal networks. This might also apply to address ranges known to be reserved for other than normal global use.

6) Filtering for commonly used TLDs that are not necessarily correlated: For example, two or more IPs that both have PTR records for hostnames with a .arpa TLD might not be due to any correlation, since that might be the case for many unrelated IPv4 and IPv6 addresses.

7) Filtering for effective TLD: In some embodiments, deemed correlations are discounted if they are based on "effective" TLDs. For example, *.co.uk domains are not correlated as would be the case with *.example.com domains. Rather, they should be correlated on the effective domain, such as "example.co.uk" and "example2.co.uk" being treated as different domains, not different subdomains. In a variation, the system treats effective TLDs or TLDs as correlated but as a minor or tunable measurement of correlation for effective TLDs. For instance <company>.<tld> or .<company> can be correlated where they are all known to be owned by a single entity.

Correlation Adjustments: The system might upweight or downweight correlations based on factors such as whether correlation is initially determined based on unusual usages of address spaces, such as internal RFC 1918 type addresses, RFC 4193 type addresses, RFC 6890 type addresses, RFC 3927 type addresses, loopback addresses, local link addresses, broadcast addresses, carrier grade NAT processes, unique local addresses, other non-routable Internet protocol addresses, etc., which might indicate that two unrelated entities have different DNS references to the same non-routable IP. More generally, address spaces might be those that are reused over a plurality of unrelated entities and so while two assets might be in the same address space, it is not necessarily an address space associated with one entity and so a correlation would result in a false positive association of the assets.

Another correlation adjustment the system might do is to remove or severely reduce weights for probability of linkages between known providers who share IP space, such as shared hosting providers, cloud based WAFs, CDNs, and virtual hosting providers.

Yet another correlation adjustment the system might do is to remove or severely reduce weights for probability of linkages by way of email address(es), phone number(s) and physical address(es), including, but not limited to, whois or any known or derived corporate addresses when the found link is known to be a privacy service including, but not limited to, domain proxy services, domain privacy services, blank or undefined whois results, placeholder results that indicate it is unknown or hidden, placeholder results that require manual/non-automated steps to uncover, or any sort of privacy proxy corporation.

Figure 5:
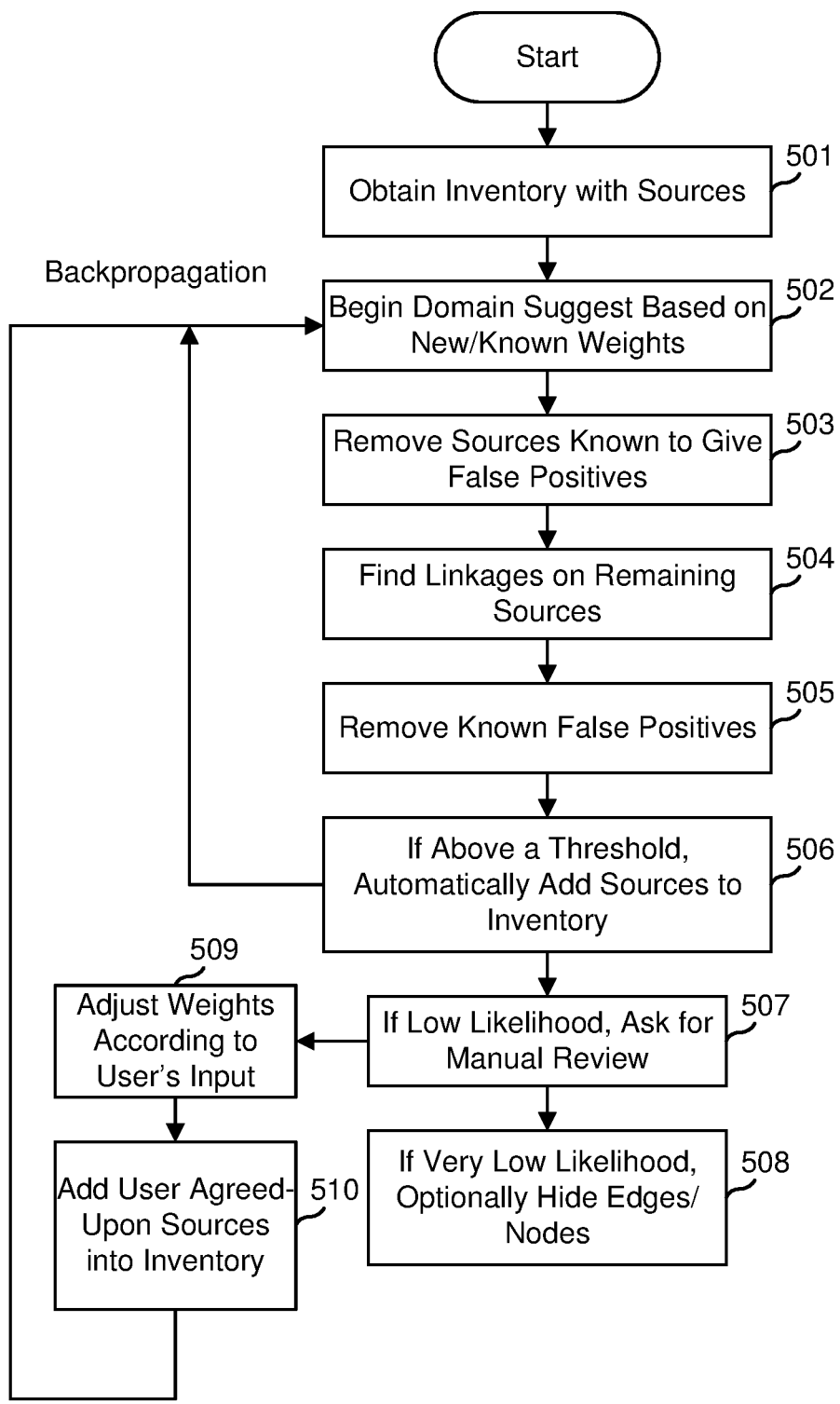
FIG. 5 is a flowchart of an example graph building process.

FIG. 5 is a flowchart of an example graph building process. As illustrated there, in step 501, a graph processor might obtain an inventory with sources. In step 502, the graph processor begins a domain suggestion process based on new or known weights. In step 503, the graph processor might remove sources known to give false positives. In step 504, the graph processor might find linkages on remaining sources, perhaps subject to a limit on how long a path might be. In step 505, the graph processor might remove known false positives. In step 506, the graph processor might test whether to automatically add sources to the inventory, perhaps based on metrics such as those shown in FIG. 4. In step 507, the graph processor might ask for manual review, as in those indicia falling within area 404 in FIG. 4 and in step 508, hide or drop low-likelihood edges. In step 506, the process might flow back to step 502. In step 507, the process might flow to step 509 to adjust weights based on user input, then to step 510 to add user agreed-upon sources to the inventory, the process might flow back to step 502.

Implementation Examples

In some embodiments, graph processing is performed to determine, from input data, a graph or other data structure that indicates, possibly with varying degrees of certainty or probability, a set of assets that are deemed to be under common control. The set of assets might be network-connected devices, services, logical objects, trademarks, names, references, and/or the like. In one approach, an expansive search is done and then reduced based on human user feedback as to false positives or other indicia of adjustment of the results to improve the resulting data. In some instances, the graph is a connected graph indicating assets and their connections to other assets. In other embodiments, the resulting graph might just be a data structure that does not necessarily connect all of the assets to other assets or even some of the assets.

In some embodiments, different indicia might have different weightings and commonality of control over assets might be determined by weighted sums of individual indicia. The weightings might be derived from human input, machine learning, feedback, or other methods. The weightings might be positive and/or negative, wherein—for example—a positive weight on an indicator might imply that the indicator is suggestive or determinative of assets being under common control, and a negative weight on an indicator might imply that the indicator is suggestive or determinative of assets not being under common control.

In some embodiments, machine rules and/or human input could be used to reduce log-tail connections. For example, a graph processor might determine that Asset A and Asset B are commonly owned, Asset B and Asset C are commonly owned, and thus conclude that Asset A and Asset C are commonly owned. The graph processor might be programmed to limit the number of extensions, so that—for example—if each of assets A, B, C, . . . , J, K, L are found to be likely commonly owned with the next asset in the sequence, as described above, and there is a graph path of eight steps, then assets A through H might be deemed to be commonly owned, but not assets I through L solely because there is a path from Asset A to Asset L in individual steps.

In some embodiments, an initial graph is uploaded using a user tool, such as a comma-delimited file or spreadsheet maintained by an operations team listing assets known to be under control of that team's organization. From there, the graph processor can extrapolate to assets not on the list.

Figure 6:
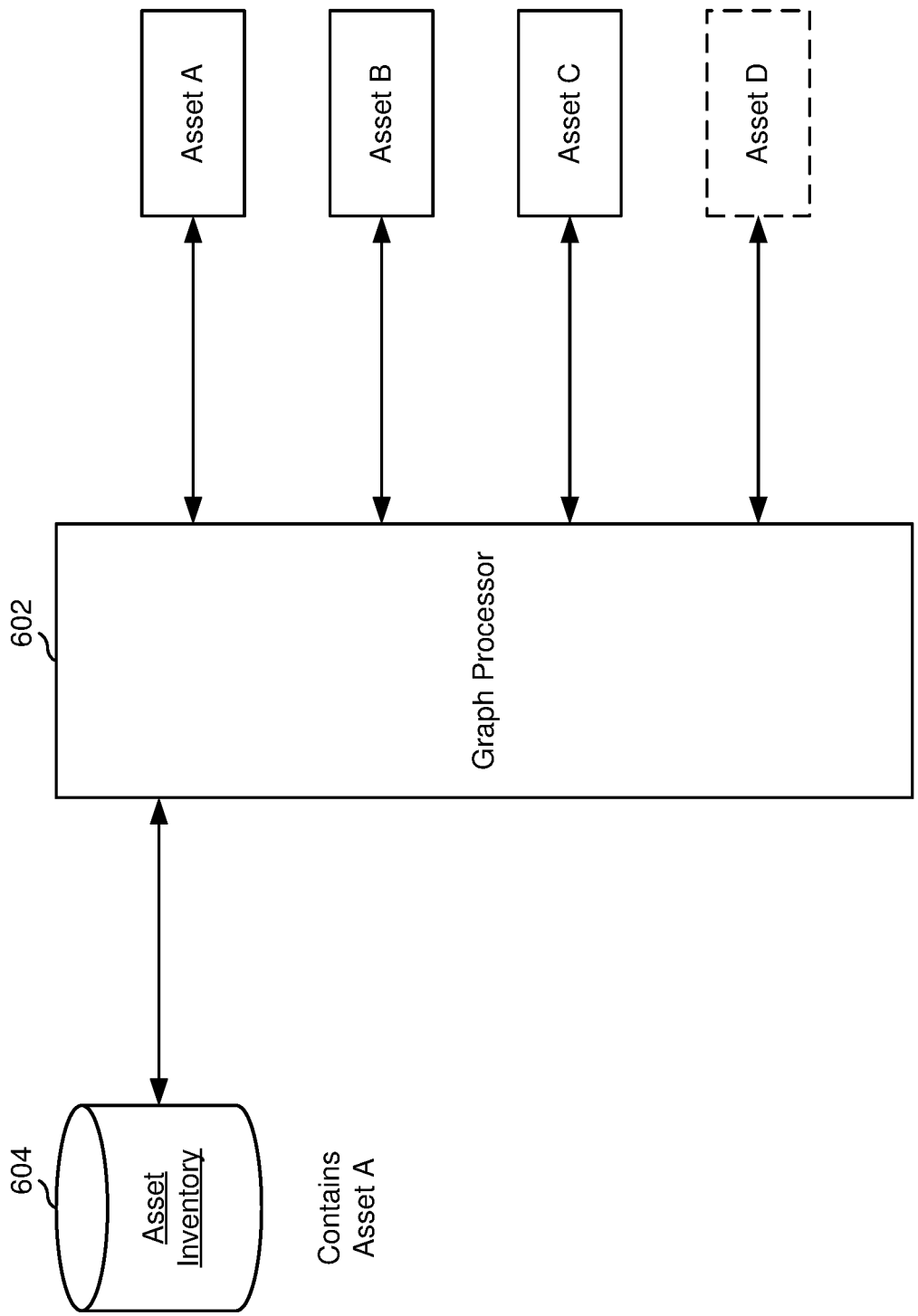
FIG. 6 illustrates graph searching and graph limiting.

FIG. 6 illustrates graph searching and graph limiting. As illustrated there, a graph processor 602 reads an asset inventory 604, which contains Asset A as one of its entries. Graph processor 602 queries Asset A to identify more data about Asset A, checking that it still exists and is responsive, etc. Graph processor 602 might do this for other assets already in asset inventory 604. Noting that Asset A correlates to Asset B and Asset C according to one or more indicia, graph processor 602 might similarly query Asset B and Asset C to identify more data about them and checking that they still exist and are responsive. Graph processor 602 might visit Asset C based on the linkage to Asset A, and find a correlation between Asset C and Asset D. In this example, Asset D is deemed too remote to consider, so it is not visited.

Figure 7:
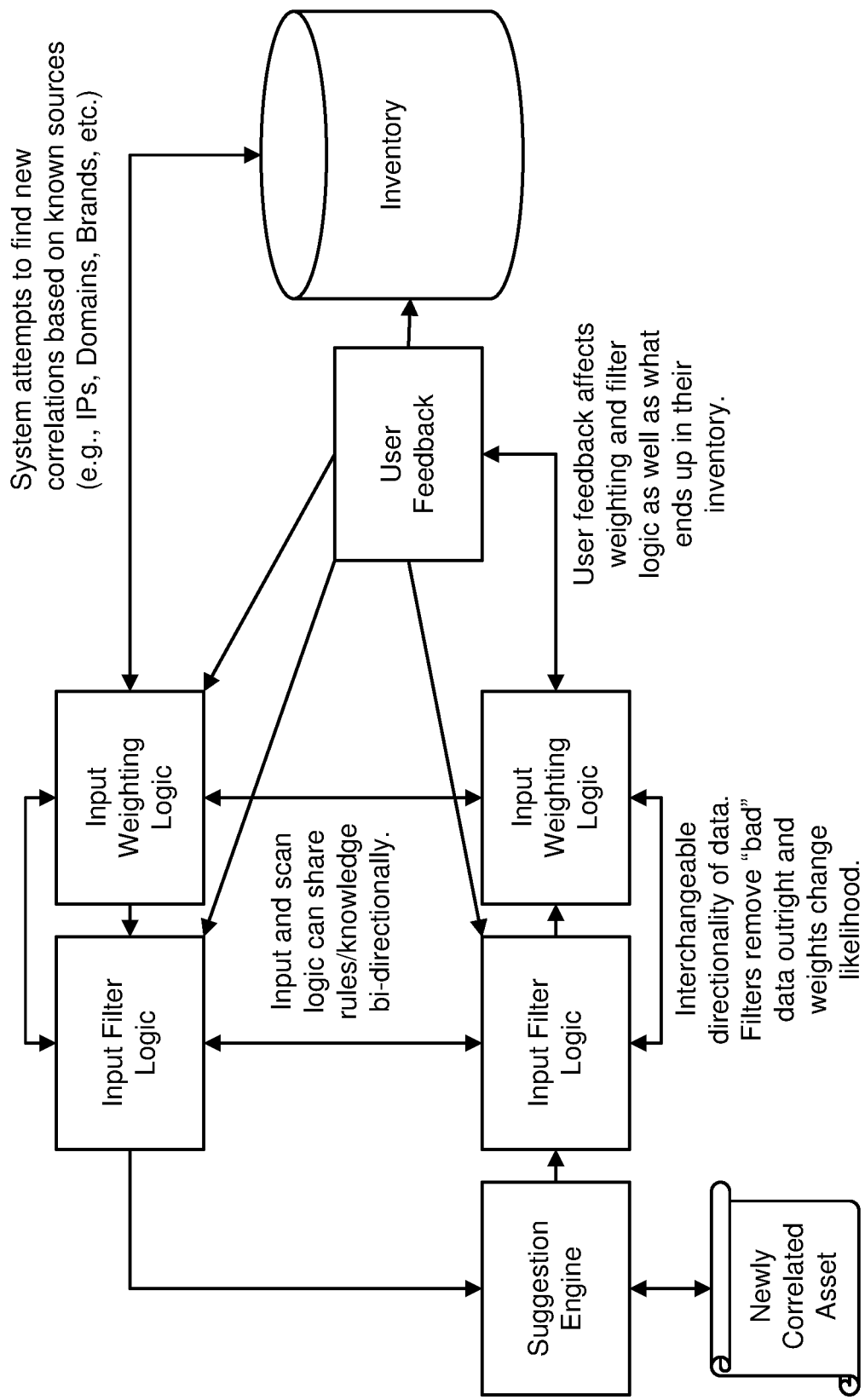
FIG. 7 illustrates an additional embodiment.

FIG. 7 illustrates an additional embodiment.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method of constructing a graph data structure representing a prospective asset inventory graph, the method comprising:
    defining a plurality of nodes within the graph data structure, each node representing an asset of a network;
    defining a plurality of edges within the graph data structure, each edge representing a connection between two respective nodes of the plurality of nodes, such that each node of the plurality of nodes is connected by at least one edge;
    defining a plurality of matching criteria indicative of a probability of common ownership between any node of the plurality of nodes and any other node of the plurality of nodes;
    by applying the plurality of matching criteria to the two respective nodes of at least some edges of the plurality of edges, defining weights within the graph data structure for the at least some edges, each weight representing a probability that the two respective nodes of the edge are commonly owned; and
    culling at least one node from the graph data structure based on a culling criterion.

2. The method of claim 1, wherein the culling criterion comprises a manual input.

3. The method of claim 1, wherein the culling criterion comprises an edge of the node having a weight that is less than a threshold value.

4. The method of claim 1, wherein defining the plurality of matching criteria comprises:
    identifying metadata for known assets of the network;
        selecting predetermined metadata about the known assets;
        canonicalizing the predetermined metadata to form canonicalized metadata;
        searching an asset database for matches to the canonicalized metadata; and
        identifying metadata that is likely an artifact of a registration process rather than an indicia of ownership or control.

5. The method of claim 4, wherein the metadata comprises at least one of a hostname, a list of vulnerabilities, a list of open ports used, estimated geolocation of the asset, operating system used for the asset, service banners of the asset, TLS certificate details of the asset, an IP address, a DNS type indicator, DNS registration data, ASN information of the IP address, or contents of technology stack indicative of one or more of a language of a web application, an API of the web application, or HTTP links that include social signals.

6. The method of claim 1, wherein a weight of an edge is a sum of individual matching weights, whereby the weight of the edge is increased for a larger number of matches.

7. The method of claim 1, wherein the plurality of nodes is derived from an ownership data structure indicative of asset ownership or asset relationship.

8. The method of claim 7, wherein the ownership data structure comprises one or more of a Domain Naming System (DNS) database, an ASN registry, a historical DNS database, a corporate ownership document database, a historical lookup database, and/or a WHOIS database.

9. The method of claim 7, wherein the ownership data structure comprises one or more of a binary tree, a sharded set of files, a lookup table, an API, and/or an mtbl.

10. The method of claim 1, wherein the culling criterion comprises at least one of human input, one or more blacklists, or a machine learning output indicative of a node not being a commonly owned asset.

11. The method of claim 1, further comprising:
    formatting a representation of the graph data structure into a display format; and
    presenting the display format on a display.

12. The method of claim 1, wherein the plurality of nodes comprises one or more of a domain, an Internet-connected asset, a subdomain, an IP address, a virtual host, a web server, a name server, IoT device, a desktop computer, a network printer, a mail server, a device connected to the Internet or an internal network, a content delivery network, a proxy, a firewall, an intrusion detection system, a router, and/or a switch.

13. The method of claim 1, wherein the plurality of nodes comprises at least one device capable of accepting network traffic.

14. The method of claim 1, wherein the plurality of matching criteria comprise one or more of:
    a first test for whether a first node of an edge shares a common registration e-mail address with a second node of the edge;
    a second test for whether the first node of the edge shares a common registration e-mail address domain with the second node of the edge;
    a third test for whether the first node of the edge was registered using e-mail address with an e-mail domain matching that of the second node of the edge;
    a fourth test for whether the first node of the edge and the second node of the edge share a WHOIS field in common;
    a fifth test for whether the first node of the edge and the second node of the edge both include hosted content that refers back to a common host;
    a sixth test for whether the first node of the edge and the second node of the edge both use a common certificate authority;
    a seventh test for whether the first node of the edge or the second node of the edge hosts pages that include links to particular other sites, excluding a pre-determined set of common linked-to sites;
    an eighth test for correlation between the first node of the edge and the second node of the edge and/or common links found in both the first node of the edge and the second node of the edge;
    a ninth test for whether the first node of the edge and the second node of the edge share a common IP address;
    a tenth test for whether the first node of the edge and the second node of the edge share a classless inter-domain routing (CIDR) block in common; or
    an eleventh test for whether the first node of the edge and the second node of the edge share a CIDR feature in common.

15. The method of claim 1, wherein the culling includes at least one of:
    filtering of addresses on a pre-determined list of reusable internal addresses; or
    filtering for top level domains (TLDs) that are on a pre-determined list of commonly reused TLDs or portions of TLDs on a pre-determined list of commonly reused portions of TLDs.

16. The method of claim 1, wherein defining weights within the graph data structure includes at least one of:
    adjusting a probability based on whether the probability is initially determined based on usages of address spaces wherein ultimate addresses are shielded by overlapping address ranges that are reusable over a plurality of unrelated entities;

adjusting a probability based on a pre-determined list of linkages between known providers sharing an address space;

adjusting a probability based on a pre-determined list of privacy services, whereby correlations for unrelated parties using a given privacy service are deemed less correlated than if they were related parties;

adjusting a probability based on known providers sharing IP space via a privacy service used by a plurality of unrelated parties;

adjusting a probability based on two nodes sharing of one or more of a domain proxy service, a domain privacy service, blank or undefined whois results, an e-mail address, a phone number, a physical address, a whois entry, a corporate address or placeholder results;

adjusting a probability based on whether two nodes have pointer (PTR) records for hostnames to a shared top-level domain;

adjusting a probability based on whether an autonomous system number (ASN) is designated as being reserved or private;

adjusting a probability based on a rule that indicates a false positive for common ownership; or adjusting a probability based on top-level domains (TLDs) that are used over unrelated entities.

17. The method of claim 16, wherein the usages of address spaces comprise one or more of internal RFC 1918 addresses, RFC 4193 addresses, RFC 6890 addresses, RFC 3927 addresses, loopback addresses, local link addresses, broadcast addresses, carrier grade NAT, unique local addressing, and/or non-routable Internet protocol addresses.

18. The method of claim 16, wherein adjusting the probability based on the rule involves applying a plurality of rules to the plurality of edges.

19. The method of claim 1, wherein defining weights within the graph data structure includes adjusting a probability based on manual feedback indicative of false positives.

* * * * *